United States Patent
Ahn et al.

(10) Patent No.: US 7,468,742 B2
(45) Date of Patent: Dec. 23, 2008

(54) INTERACTIVE PRESENTATION SYSTEM

(75) Inventors: Sang-Chul Ahn, Seoul (KR); Hyoung-Gon Kim, Seoul (KR); Ig-Jae Kim, Seoul (KR); Chang-Sik Hwang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 622 days.

(21) Appl. No.: 11/001,079

(22) Filed: Dec. 2, 2004

(65) Prior Publication Data

US 2005/0151850 A1   Jul. 14, 2005

(30) Foreign Application Priority Data

Jan. 14, 2004   (KR) .................... 10-2004-0002700

(51) Int. Cl.
*H04N 5/225* (2006.01)

(52) U.S. Cl. ............................ 348/207.99; 348/207.1; 348/207.11; 348/211.11; 348/211.14; 345/156; 345/157; 345/158; 345/159

(58) Field of Classification Search ............ 348/207.99, 348/207.1, 207.11, 211.11, 211.14; 345/156, 345/157, 158, 159
See application file for complete search history.

(56) References Cited

U.S. PATENT DOCUMENTS

| | | | | |
|---|---|---|---|---|
| 4,542,291 A | * | 9/1985 | Zimmerman | 250/231.1 |
| 5,495,576 A | * | 2/1996 | Ritchey | 345/420 |
| 5,999,208 A | * | 12/1999 | McNerney et al. | 348/14.08 |
| 6,175,343 B1 | * | 1/2001 | Mitchell et al. | 345/8 |
| 6,583,808 B2 | * | 6/2003 | Boulanger et al. | 348/14.09 |
| 6,982,743 B2 | * | 1/2006 | Danilidis et al. | 348/162 |
| 7,084,874 B2 | * | 8/2006 | Kurzweil | 345/473 |
| 7,259,747 B2 | * | 8/2007 | Bell | 345/156 |
| 2002/0064382 A1 | * | 5/2002 | Hildreth et al. | 396/100 |
| 2003/0048280 A1 | * | 3/2003 | Russell | 345/619 |
| 2004/0060037 A1 | * | 3/2004 | Damm et al. | 717/104 |
| 2004/0069754 A1 | * | 4/2004 | Bates et al. | 219/121.63 |
| 2004/0093219 A1 | * | 5/2004 | Shin et al. | 704/275 |
| 2004/0196400 A1 | * | 10/2004 | Stavely et al. | 348/333.01 |
| 2005/0206513 A1 | * | 9/2005 | Fallon | 340/506 |
| 2006/0093186 A1 | * | 5/2006 | Ivanov | 382/103 |

* cited by examiner

*Primary Examiner*—David L Ometz
*Assistant Examiner*—Quang V Le
(74) *Attorney, Agent, or Firm*—McDermott Will & Emery LLP

(57) ABSTRACT

The present invention discloses an interactive presentation system which allows a presenter to perform a presentation while having various interactions directly with presentation material images in real time through a gesture or/and voice. The interactive presentation system comprises: an active infrared camera; a command recognition system connected to the active infrared camera; and an image synthesis system connected to the active infrared camera and the command recognition system. The presentation system may further comprises a stereo camera set for properly synthesizing a presenter in a 3D image and a 3D motion system. By this configuration, it is possible to embody an interactive presentation system in which a command through a presenter's gesture or voice is processed in real time and the image of the presenter is synthesized in a presentation material screen in real time, and accordingly the audiovisual effect is maximized.

10 Claims, 9 Drawing Sheets

INTERACTIVE PRESENTATION SYSTEM

BACKGROUND OF THE INVENTION

1. Field of the Invention

The present invention relates to an interactive presentation system using a computer, and more particularly, to an interactive presentation system which allows a presenter to perform a presentation while interacting directly with images of a presentation material screen being displayed.

2. Description of the Background Art

In a typical presentation using a computer, a presenter shows an audience presentation materials by displaying them on a computer monitor or projecting them on a large-sized screen through a projector or the like, and points at and explains a specific part of the presentation materials by using a pointer bar or laser pointer or the like at the presentation materials to be displayed. Further, the presenter interacts with a computer by directly operating the computer in order to skip the pages of the presentation materials or execute an object like a video or file contained in the presentation materials. Recently, the presenter often performs an interaction by the use of a wireless mouse or remote controller, spaced at a certain distance from the computer. However, this presentation method according to the prior art is problematic in that there is a restriction on the interaction the presenter can perform and the procedure or interaction is not natural as compared to a presentation without a computer.

Further, the presentation method according to the prior art is problematic in that this method is available only if the presenter, the computer storing the presentation materials and the audience all should be in the same place. As a measure for overcoming this spatial problem, currently being used is a method in which, if an audience is at a remote place, a presenter offers a presentation as in the prior art, photographs this by a video camera and sends it to the remote place via a communication network. But, this method is problematic in that the resolution of the video camera is poorer than the resolution of a computer monitor, and thus the presentation materials is not seen well at the remote place.

To solve these problems, there has been a method of storing the presentation materials in a computer prepared at the remote place where the audience is located, displaying it through the computer, sending the images of the presenter to the remote place through a video camera and displaying them simultaneously with the presentation materials. However, this method has a difficulty of having to synchronizing the images of the presenter and the presentation materials.

As another measure, there is a method in which a presenter behaves according to a written script, graphics are processed later based on these behaviors and synthesized in images, which is frequently used in documentary programs produced by broadcasting companies. However, this method has a demerit that it cannot be utilized as a real-time presentation system since the presenter can perform only an interaction restricted by the script, cannot perform extemporaneous activities and cannot view composite images in real time.

As yet another measure, there is a method for synthesizing weather data images and reporter's images and displaying them as in weather forecasting systems used in broadcasting companies. This system also has a demerit that only simple interactions like a reporter's skipping to the next screen image by a control device such as buttons can be performed as in the aforementioned prior art.

Accordingly, there is demand for a presentation system by which a presenter can interact with presentation material images in real time in various ways.

SUMMARY OF THE INVENTION

Therefore, an object of the present invention is to provide an interactive presentation system which allows a presenter to perform a presentation while having various interactions directly with presentation material images in real time through a gesture or/and voice.

To achieve these and other advantages and in accordance with the purpose of the present invention, as embodied and broadly described herein, there is provided an interactive presentation system, comprising: an active infrared camera for taking an image of a presenter; a command recognition system connected to the active infrared camera to perform the presenter's gesture recognition algorithm upon receipt of the presenter's infrared image from the active infrared camera and outputting a corresponding command; and an image synthesis system connected to the active infrared camera to synthesize the image of the presenter and the presentation material screen upon receipt of the presenter's image from the active infrared camera, and connected to the command recognition system via a network to control the presenter's position in the presentation material screen and the proceeding of the presentation material screen upon receipt of a command signal outputted from the command recognition system.

It is preferred that the active infrared camera of this invention comprises: an infrared irradiation device mounted so that an infrared irradiation region can be coincident with the visual field range of the active infrared camera and for irradiating infrared rays to the presenter; a cold mirror for transmitting the infrared rays reflected by the presenter and reflecting visible rays; an infrared camera for acquiring the infrared image of the presenter upon receipt of the infrared rays transmitted by the cold mirror; and a moving image camera for acquiring the image of the presenter upon receipt of the visible rays reflected by the cold mirror, so that the coordinate of the image of the presenter can be coincident with the coordinate of the infrared image. Also, the active infrared camera further comprises a reflecting mirror for making the visible rays incident on the moving image camera by receiving and reflecting the visible rays reflected by the cold mirror, thereby efficiently reducing the configuration space of the infrared camera and moving image camera.

Preferably, the interactive presentation system of this invention further comprises infrared reflecting markers being wearable by the presenter and for retroreflecting infrared rays radiated by the infrared irradiation device of the active infrared camera onto the active infrared camera, so that the infrared rays irradiated on the infrared reflecting markers from the infrared irradiation device mounted on the active infrared camera are made incident on the active infrared camera by retroreflection to thus increase the infrared image recognition rate of the presenter's gesture.

Furthermore, the gesture recognition algorithm executed by the command recognition system comprises: the thresholding step of extracting image blobs of the infrared reflecting markers worn by the presenter inputted from the active infrared camera; the blob labeling step of performing image labeling of the blobs extracted by the thresholding step; the blob recognition step of extracting one or two large labeling blobs by the blob labeling step; the angle & position computation step of computing the angle, central position, height and width of the infrared reflecting markers using the extracted blobs by the blob recognition step; the gesture recognition step of recognizing a gesture by determining a gesture mode of the infrared reflecting markers based on the results computed in the angle & position computation step.

Preferably, in the blob labeling step, a predetermined boundary blob is set around the infrared reflecting marker blobs acquired from the previous frame so that labeling is performed only within the boundary blob in the next frame, thereby sharply reducing the amount of operation and accordingly enabling real time processing of gesture recognition.

Preferably, the interactive presentation system of this invention is controlled not only by the gesture of the presenter but also by the presenter's voice command by receiving a voice command of the presenter and outputting a command signal to the image synthesis system.

Furthermore, the interactive presentation system of this invention further comprises: a stereo camera set consisting of a plurality of cameras for three-dimensionally detecting the motion of the presenter; and a 3D motion tracking system connected to the stereo camera set and for computing the position of the presenter on a 3D image coordinate by receiving the image of the presenter from the stereo camera set. Preferably, the 3D motion tracking system is connected to the image synthesis system via a network and sends the position information of the presenter to the image synthesis system so that the image of the presenter can be synthesized in a proper position of a 3D presentation material image if the presentation material image is 3D.

Furthermore, the interactive presentation system of this invention further comprises a projector connected to the image synthesis system and for projecting the presentation material synthesized in the image synthesis system so as to show the synthesized presentation material to the audience who are in the same place with the presenter. Alternatively, the interactive presentation system can be configured to show the synthesized presentation material to the audience who are in a difference place from the presenter by the image synthesis system's sending the presentation materials synthesized in the image synthesis system to a remote place via a network.

BRIEF DESCRIPTION OF THE DRAWINGS

In the drawings:

FIG. 3b illustrates photographs of the user wearing the markers, respectively of FIG. 3a;

DETAILED DESCRIPTION OF THE PREFERRED EMBODIMENTS

Hereinafter, a preferred embodiment of the present invention will be described with reference to the accompanying drawings.

Figure 1:
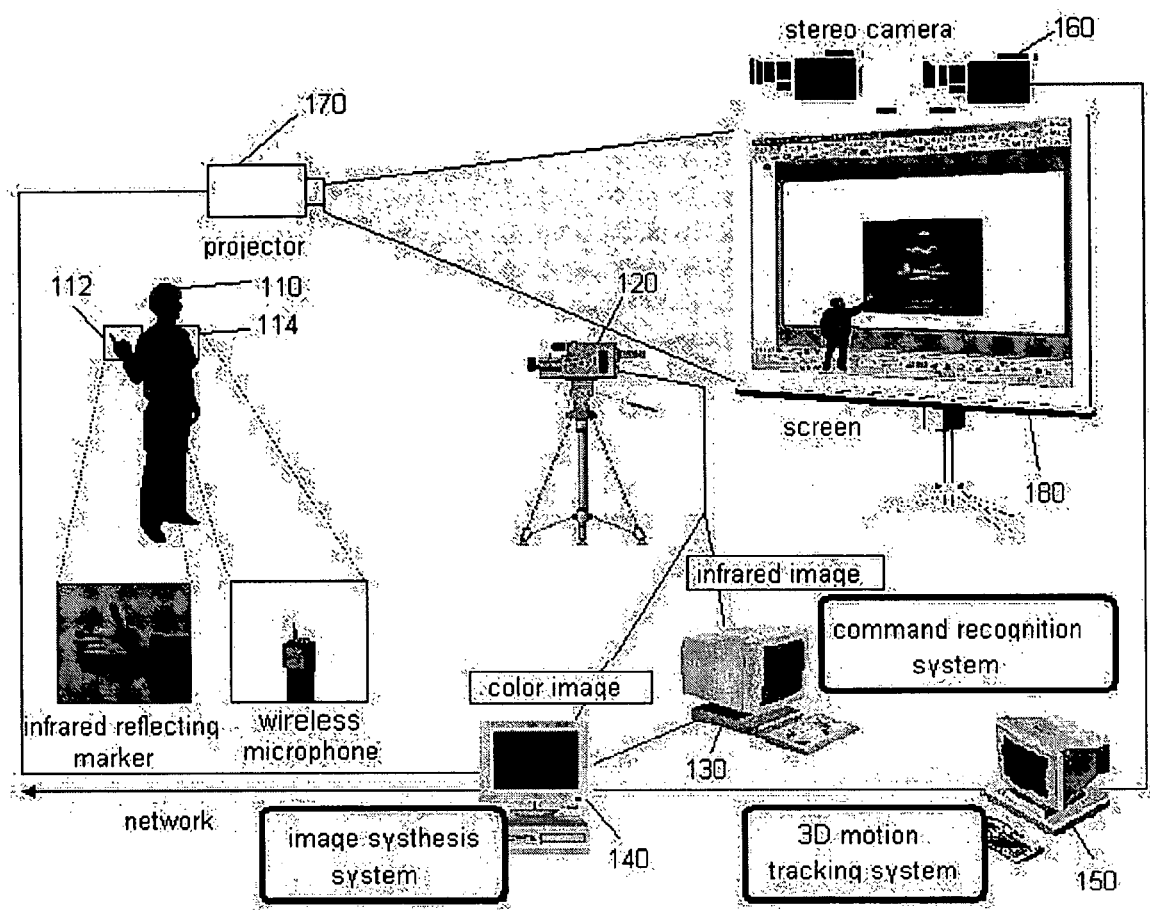
FIG. 1 illustrates a schematic view of an interactive presentation system in accordance with the present invention.

Referring to FIG. 1, a schematic view of an interactive presentation system in accordance with the present invention is illustrated. As illustrated in FIG. 1, the interactive presentation system of this invention comprises an active infrared camera 120, a command recognition system 130 and an image synthesis system 140. The interactive presentation system may further comprise a three-dimensional motion tracking system 150 for three-dimensional synthesis of presentation materials and a presenter 110. They are connected via a network. The interactive presentation system further comprises an infrared reflecting marker 112 (hereinafter, 'marker') to be worn on the presenter's finger, a projector 170 for projecting composite images of the presenter 110 and the presentation materials, a screen 180 for displaying the composite images output from the projector 170 and a stereo camera 160 for tracking the motion of the presenter 110.

The active infrared camera 120 takes images of the presenter within the visual field of the active infrared camera 120, and outputs an infrared image of the presenter to the command recognition system 130 and a moving image of the presenter to the image synthesis system 140. The command recognition system 130 recognizes a gesture command from the presenter' infrared image received from the active infrared camera 120 and sends this command to the image synthesis system 140. At this time, the presenter 110 is able to remotely interact with the command recognition system 130 by wearing the marker 112 on a finger and making a certain gesture of a command. Additionally, the presenter 110 is able to enter a voice signal into the command recognition system 130 through a wireless microphone 114. The image synthesis system 140 synthesizes the presenter's moving image input from the active infrared camera 120 with a presentation material screen, and receives a gesture command or voice command sent from the command recognition system 130 to take control of the presentation materials. The three-dimensional motion tracking system 150 is connected to the stereo camera 160 consisting of a plurality of cameras, and the stereo camera 160 takes an image of the presenter 110 to output it to the three-dimensional motion tracking system 150. The three-dimensional motion tracking system 150 receives it and separates the presenter image from the background image, and sets the position of the presenter on a three-dimensional image coordinate to send this information to the image synthesis system 140. The image synthesis system 140 receives the position coordinate of the presenter 110 from the three-dimensional motion tracking system 150 and synthesizes the presenter image with the corresponding position. The image synthesis system 140 is connected to the projector 170 and is able to show the presentation screen to the audience by projecting the synthesized presentation screen on a screen 180 or the like or able to sent the synthesized presentation screen to the audience at a remote place via a network. A detailed description of the respective parts of the system will be described below in detail with reference to the associated drawings.

Figure 2A:
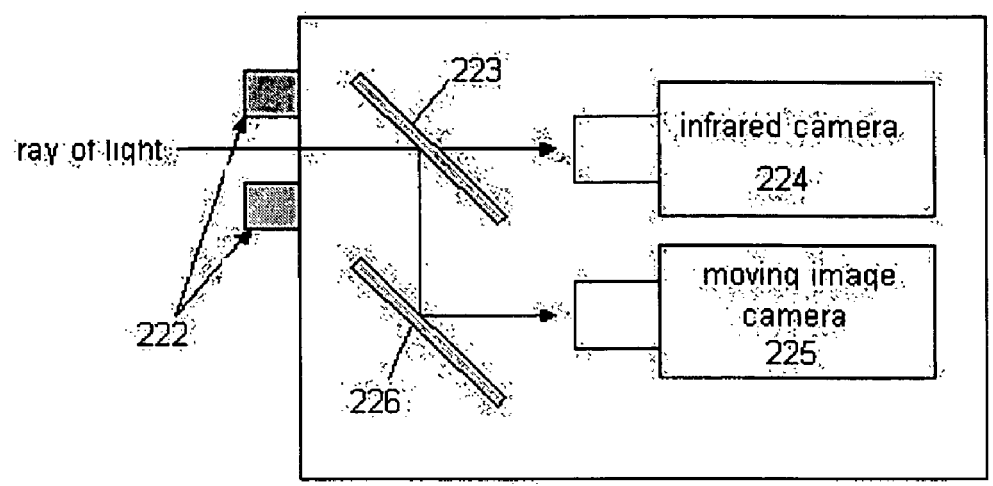
FIG. 2a illustrates a side view of an active infrared camera.
Figure 2B:
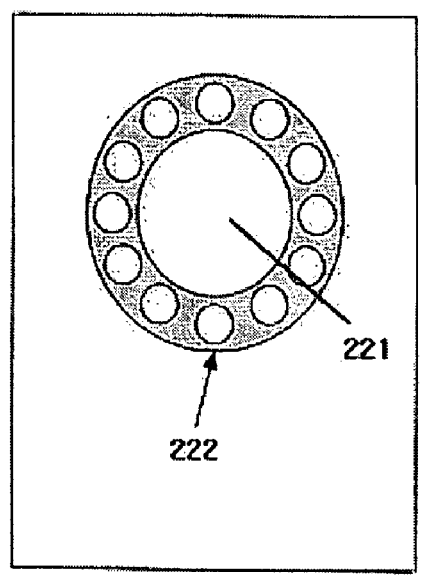
FIG. 2b illustrates a front view of an active infrared camera.

Referring to FIGS. 2a and 2b, a block diagram of the active infrared camera 120 as shown in FIG. 1 is illustrated. FIG. 2a is a view illustrating a side internal structure of the active infrared camera 120, and FIG. 2b is a view illustrating a front profile of the active infrared camera 120. The active infrared camera 120 comprises one or more infrared irradiation device 222, a cold mirror 223, an infrared camera 224, a moving image camera 225 and a reflecting mirror 226. It is preferred to use an infrared LED (light emitting diode) having a high straight advancing property of light as the infrared irradiation device 222 and mount it around a lens portion 221 of the active infrared camera 120 to make the visual field of the camera coincident with the irradiation range of infrared rays. By acquiring an infrared gesture image of the presenter 110 by the use of the infrared irradiation device 222, the command recognition system 130 can recognize the gesture without any effect of a change in a peripheral visible ray lighting. As illustrated therein, the cold mirror 223 passing only infrared rays and reflecting visible rays is arranged in the same straight line with the lens portion 221, and the infrared camera 224 is arranged in the back of the cold mirror 223, thus an infrared light reflected by the subject (i.e., presenter) and incident through the lens portion 221 is incident upon the infrared camera 224. The reflecting mirror 226 is arranged in the position where a visible light reflected by the cold mirror 223 can be reflected, and the moving image camera 225 is arranged in such a manner to receive a visible light reflected by the reflecting mirror 226, whereby the visible light reflected by the cold mirror 223 is reflected by the reflecting mirror 226 and incident upon the moving image camera 225 as shown in the drawings. Next, the infrared image output by the infrared camera 224 is input into the command recognition system 130 to make the gesture of the presenter 110 recognizable as a command, and the presenter's image (i.e., visible ray image) output by the moving image camera 255 is input into the image synthesis system 140 and synthesized in the presentation material screen. The active infrared camera 120 consisting of the infrared camera 224 and the moving image camera 225 makes the coordinate of the composite image in the image synthesis system 140 coincident with the coordinate of the infrared image. That is, for example, if the presenter selects a certain icon by hand, the image of the presenter's hand is located on the selected icon on the synthesis presentation material screen.

Figure 3A:
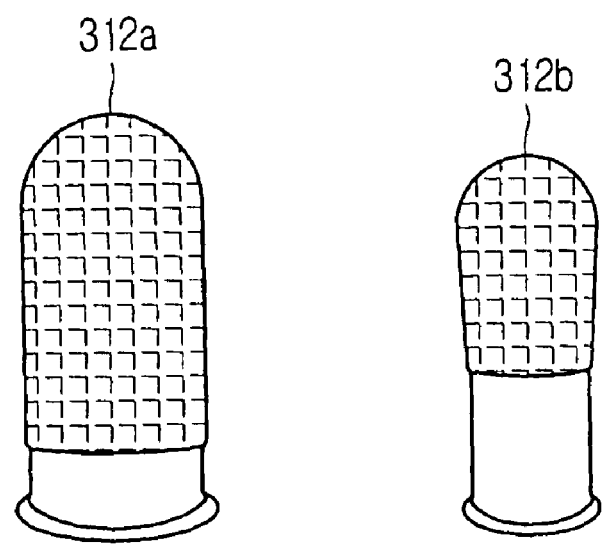
FIG. 3a illustrates photographs of infrared reflecting markers in accordance with the present invention.
Figure 3B:
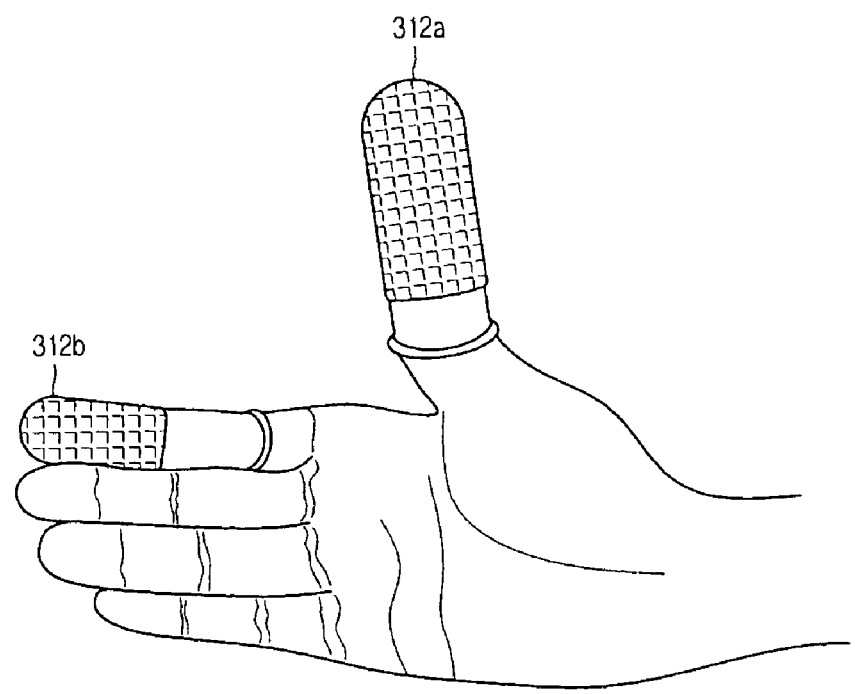

Referring to FIGS. 3a and 3b, FIGS. 3a and 3b illustrate photographs of the infrared reflecting markers 312a and 312b in accordance with the present invention and photographs of the user wearing these markers, respectively. It is preferable to make interaction with a computer convenient by manufacturing infrared reflectors of a thimble shape for reflecting infrared rays irradiated on it to interact with the computer and wearing it on fingers, which are the most versatile in motion among body regions. It is more preferable to make the two markers easily discriminated by their size by a computer machine to be described below by wearing the markers 312a and 312b of different sizes on the thumb and the index finger (for example, the marker to be worn on the thumb is made larger in size and the marker to be worn on the index finger is made smaller in size). Further, it is preferable to make the markers 312a and 312b of the material having the retroreflection property against infrared rays. This is because blobs of the infrared reflectors 112 can be precisely detected by reflecting the infrared rays irradiated from the active infrared camera 120, described in association with FIGS. 2a and 2b, in the direction of the active infrared camera 120 by the use of the retroreflection of the markers 312a and 312b. The material having the retroreflection property is well known, representatively includes reflection fabrics, reflection tapes, etc. coated with retroreflective fine glass beads. By the use of such infrared reflectors, the user is free in its activities without physical restrictions during an interaction with a computer, and moreover can precisely detect objective blobs.

Figure 4:
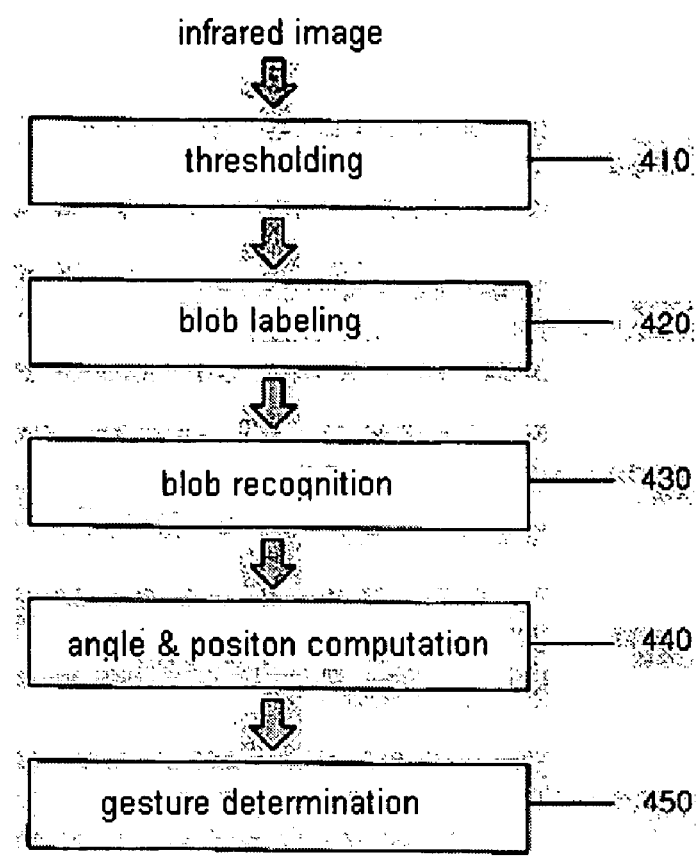
FIG. 4 illustrates a flow chart of a gesture recognition algorithm carried out in a computer machine of a command recognition system.

The command recognition system 130 of this invention allows the presenter 110 to interact with presentation materials by using image recognition (i.e., recognition of the presenter's gesture) and voice recognition techniques. Referring to FIG. 4, there is illustrated a flow chart of a gesture recognition algorithm carried out in a computer machine of the command recognition system 130. As illustrated therein, the gesture recognition algorithm carried out by the computer machine comprises: a thresholding step 410, a blob labeling step 420, a blob recognition step 430, an angle & position computation step 440 and a gesture decision step 450.

The thresholding step 410 is the step of extracting image blobs of the infrared reflectors input from an image acquisition apparatus. Since the blobs of the infrared reflectors on the image acquired by the image acquisition apparatus have a bright value, only the blobs of interest are extracted by using the thresholding technique for converting an input image into a binary-coded image. Such technique is a well known art in the fields of image processing, in which the parts excepting the blobs of infrared reflectors, i.e., the blobs of interest, are eliminated by the following formula:

$$g(x,y)=1 (f(x,y)>T)$$

$$0 (f(x,y)<T)$$

Wherein g(x,y) represents the value of a binary image after thresholding, f(x,y) represents the value of an infrared image input from the image acquisition apparatus, and T represents a threshold designated by the user. The value T can be designated according to the properties of infrared reflectors and the strength of an infrared irradiation apparatus. For example, if the value of one pixel ranges from 0 to 255, it is appropriate that an intermediate value of 128 should be designated as the value T.

The blob labeling step 420 is the step of performing image labeling by attaching individual labels to individual components of the image of the blobs of interest extracted by the thresholding step 410. According to the preferred embodiment, in this test, the markers 312a and 312b worn on the thumb and index finger are discriminated according to the image labeling. In this step 420, eight connection elements (or four connecting elements), which are the objects of interest, are found out by searching the infrared image, binary-coded by thresholding, in unit of pixel from the left to the right and from the upper end to the lower end. At this time, in the procedure of reading an image, if the centering pixel is p, the partial neighboring pixel at the upper end of p is r, the partial neighboring pixel at the left side of p is t, the partial neighboring pixel at the left opposite angle of p is q, and the partial neighboring pixel at the right opposite angle of p is s, when it is desired to find out eight connecting elements, r, t, q and s taken into account (when it is desired to find out four connecting elements, r and t are taken into account). If the value of p is 0, it is neglected. If the value of p is 1, partial neighbors are inspected. If every partial neighbor is 0, a new name is given. If only one neighbor is 1, the name of the neighbor is given. If two or more neighbors are 1, one of their names is given and the fact that the names are identical is recorded. Next, the identical names are united upon re-searching. After the searching job, every pixel having a value of 1 becomes to have their name. Thus, two blobs having different names are obtained from an infrared image through image labeling.

It is inappropriate to perform such image labeling on the entire image by each frame as in the prior art from an aspect of real time processing because it takes a lot of operation time. Accordingly, in the present invention, a predetermined boundary blob is set around the central coordinate of each of the infrared reflector blobs acquired from the previous frame so that labeling is performed only within the boundary blob in the next frame, thereby sharply reducing the amount of operation. The aforementioned boundary blob is preferably set to have a size twice larger than the blobs of interest. The image acquisition apparatus acquires an image at a speed of 30 frames per second, thus the blob in which fingers are movable between frames is small, thereby making it possible to predict the boundary blob which is to be an objective blob of the next frame from the central coordinate of the previous frame. In this way, in the present invention, image labeling is appropriate for real time processing since it reduces the amount of operation much more as compared to the prior art by performing image labeling not on the entire image blobs but on partial blobs predicted from the previous blob.

The blob recognition step 430 is the step of extracting one or two large blobs of obtained labeling blob, and then the larger one is referred to as a thumb marker blob (512a of FIG. 5) and the smaller one is referred to as an index finger marker blob (512b of FIG. 5) by comparison of the sizes of the blobs. If the smaller one is much smaller than the larger one, then it is regarded as a noise. In this case, it is prefer to extract only the larger one because it is the case where a thumb marker blob (512a of FIG. 5) is combined with a index finger marker blob (512b of FIG. 5).

Next, the angle & position computation step 440 is the step of computing the angle, central position, height and width of the infrared reflectors using the image labeled in the blob labeling step. In this step 430, in case that markers 312a and 312b of different sizes are worn on the user's two fingers as in the above-described embodiment, a gesture is discriminated in consideration of the direction and position of the fingers with respect to individual labeled finger blobs. Firstly, to determine the direction of the fingers, the direction of the blobs is computed by the following formula by the use of a second moment coefficient. The centers of the individual finger blobs are estimated by using a zero-order moment and a first-order moment.

$$M_{00} = \sum_x \sum_y I(x, y)$$

$$M_{01} = \sum_x \sum_y y \cdot I(x, y)$$

$$M_{10} = \sum_x \sum_y x \cdot I(x, y)$$

$$(x_c, y_c) = \left(\frac{M_{10}}{M_{00}}, \frac{M_{01}}{M_{00}}\right)$$

Wherein $x_c$ and $y_c$ are the moment coefficients representing the central coordinate of the finger blobs, $I(x,y)$ is the moment coefficient representing the brightness value of pixels corresponding to the finger blobs, and $M_{ij}$ is the moment coefficient representing the directional order of x and y.

Next, the direction angle $\theta$ of the fingers is computed by using the second moment expressed by the following formula:

$$M_{20} = \sum_x \sum_y x^2 \cdot I(x, y)$$

$$M_{02} = \sum_x \sum_y y^2 \cdot I(x, y)$$

$$a = \frac{M_{20}}{M_{00}} - x_c^2$$

$$b = 2\left(\frac{M_{11}}{M_{00}} - x_c y_c\right)$$

$$c = \frac{M_{02}}{M_{00}} - y_c^2$$

$$\theta = \frac{1}{2}\tan^{-1}\left(\frac{b}{a-c}\right)$$

Wherein $x_c$ and $y_c$ are the moment coefficients representing the central coordinate of the finger blobs, $I(x,y)$ is the moment coefficient representing the brightness value of pixels corresponding to the finger blobs, and $M_{ij}$ is the moment coefficient representing the directional order of x and y.

Figure 5:
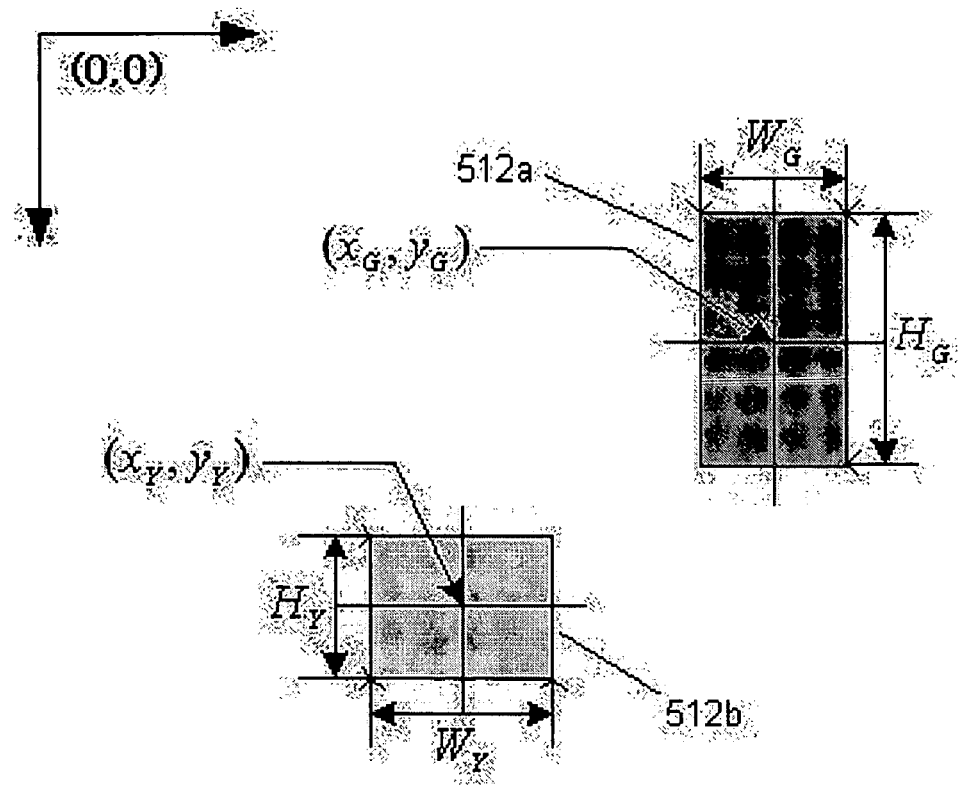
FIG. 5 illustrates position, height and width of respective infrared reflecting marker extracted in a command recognition system.

And the values of the number of pixels, average central value, width and height of the blobs of interest derived in the blob labeling step are computed (refer to FIG. 5). In FIG. 5, reference numeral 512a is the blob of interest corresponding to the thumb marker 312a, and reference numeral 512b is the blob of interest corresponding to the index finger marker 312b. $W_G$ and $W_Y$ in the drawing represent the width of each blob, $H_G$ and $H_Y$ represent the height of each blob and $(x_G, y_G)$ and $(x_y, y_y)$ represent the central coordinate of each blob.

In the gesture recognition step 450, first it is checked which one of the conditions shown in the following table matches with the above computed results.

| Condition | | explanation |
|---|---|---|
| I | $y_Y - y_G \geq \dfrac{H_Y + H_G}{2} + \dfrac{H_Y + H_G}{4}$ | Second marker is under first marker |
| II | $-(y_Y - y_G) \geq \dfrac{H_Y + H_G}{2} + \dfrac{H_Y + H_G}{4}$ | Second marker is above first marker |
| III | $x_Y - x_G \geq \dfrac{W_Y + W_G}{2} + \dfrac{W_Y + W_G}{4}$ | Second marker is at the right of first marker |
| IV | $-(x_Y - x_G) \geq \dfrac{W_Y + W_G}{2} + \dfrac{W_Y + W_G}{4}$ | Second marker is at the left of first marker |
| V | $\text{abs}(x_Y - x_G) \leq \dfrac{W_Y + W_G}{2}$ | Two markers exist vertically within predetermined range |

Figure 6:
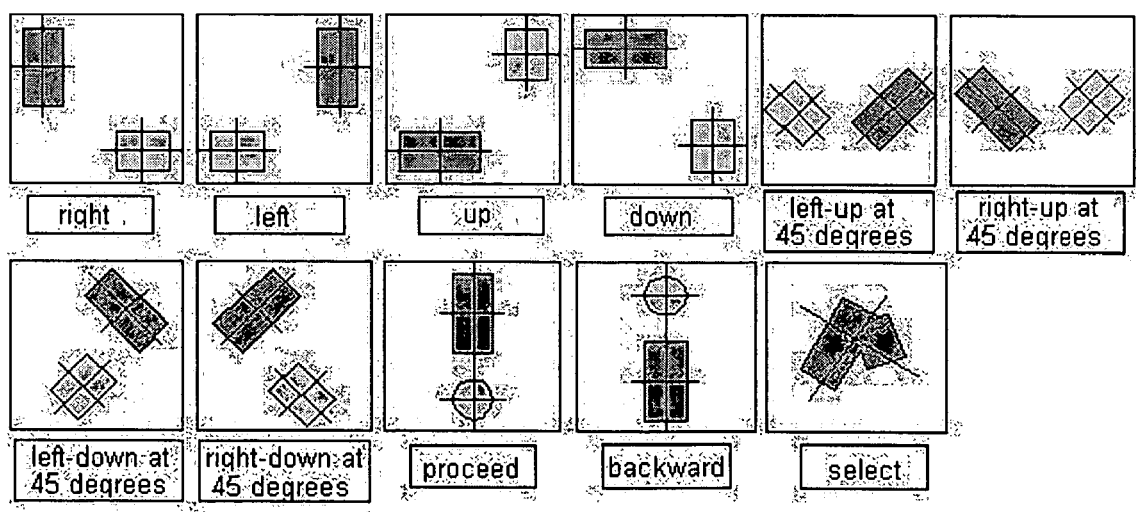
FIG. 6 illustrates one example of gesture mode that can be designated in the algorithm executed by the computer machine of the present invention.

As a result, the gesture is recognized by determining a gesture mode of the infrared reflectors based on the corresponding condition. FIG. 6 illustrates one example of gesture mode that can be designated in the algorithm executed by the computer machine of the present invention.

Hereinafter, one example of gesture mode determination will be described with reference to the above table and the types of gesture mode of FIG. 6. If the angle of a thumb thimble blob (i.e., first marker in the above table, hereinafter, refer to the same) forms 90 degrees with respect to the X axis (transverse axis) of an image coordinate and the angle of an index thimble blob (i.e., second marker in the above table, hereinafter, refer to the same) forms 0 degree, and at the same time Condition I and Condition IV about the positional relation are satisfied, this is recognized as "right" mode to go right. If the angle of the thumb thimble blob forms 90 degrees and the angle of the index thimble blob forms 0 degree, and at the same time Condition I and Condition III about the positional relation are satisfied, this is recognized as "left" mode to go left. If the angle of the thumb thimble blob forms 0 degree and the angle of the index thimble blob forms 90 degrees, and at the same time Condition II and Condition IV about the positional relation are satisfied, this is recognized as "up" mode to go upward. If the angle of the thumb thimble blob forms 0 degree and the angle of the index thimble blob forms 90 degrees, and at the same time Condition I and Condition IV about the positional relation are satisfied, this is recognized as "down" mode to go downward. If both the angle of the thumb thimble blob and the angle of the index thimble blob form 90 degrees, and at the same time Condition I and Condition V about the positional relation are satisfied, this is recognized as "proceed" mode to go forward. If both the angle of the thumb thimble blob 512a and the angle of the index thimble blob 512b form 90 degrees, and at the same time Condition II and Condition V about the positional relation are satisfied, this is recognized as "go back" mode to go backward. Similarly, it is possible to recognize right-up, right-down, left-up, left-down modes, etc. Additionally, in case the thumb thimble blob 512a and the index finger thimble blob 512b are overlapped and recognized as one blob, this is recognized as "select" mode to select a corresponding category (i.e., in case of an input device like a mouse, to click the left button). The computer machine recognizes other gestures except this as a nonsense gesture, and the user can interact with the computer by wearing the infrared reflectors within a visual field range of the image acquisition apparatus and making a gesture according to a preset gesture mode like this. Like this, by enabling matching by combining the conditions derived by simple formula processing and comparatively operating only whether or not these conditions are coincident with the conditions of a designated gesture, the amount of operation is largely reduced as compared to the prior art method of recognizing a gesture by comparison with feature points of all command sets based on conventionally extracted gesture features, and thereby real time processing is enabled.

As illustrated in FIG. 1, the command recognition system 130 can be configured to allow the presenter 110 to control presentation materials by a voice command by performing recognition according to a command given by the presenter 110 through the wireless microphone 114 and sending the result to the image synthesis system 140. The voice recognition system can be implemented by using a well-known voice recognition module.

The configurations of executable gesture/voice commands are changeable according to the contents of a presentation, and also changeable according to the recognition system. One example of an implementable gesture/voice command set is shown in the following table. 2D avatar move is the mode that is implemented on a 2D presentation material screen, and 3D navigation is the mode that is implemented on a 3D presentation material screen.

| Type | Detailed Service | Comments |
| --- | --- | --- |
| Hand gesture | Left/Right Up/Down | 2D avatar move or 3D navigation |
| | Forward/Backward | 3D navigation |
| | Select | Left mouse button Double click |

| Type | Detailed Service | Comments |
| --- | --- | --- |
| Voice | Left/Right Up/Down | 2D avatar move or 3D navigation |
| | Slideshow | Powerpoint full screen |
| | Next/Previous Select | Proceed or go back |
| | Close | Window close |
| | Pen Mode | Powerpoint pen mode |
| | Pen Mode Exit Screen Keyboard | |
| | Navigation | 3D navigation start |
| | Forward/Backward | 3D navigation |
| | Navigation Stop | 3D navigation stop |
| | Music Start | Media Player start |
| | Equalizer | Media Player equalizer |
| | Help | Call a helping MS Agent |

By using this gesture and/or voice command recognition system 130, the presenter 110 can move an his or her image (hereinafter, 'avatar') of presentation screen in the image displaying the presentation materials toward a desired, and also can control the proceeding of the presentation materials in an interactive way.

And the presenter 110 can move an avatar by walking himself or herself to a desired direction in field of view.

Figure 7:
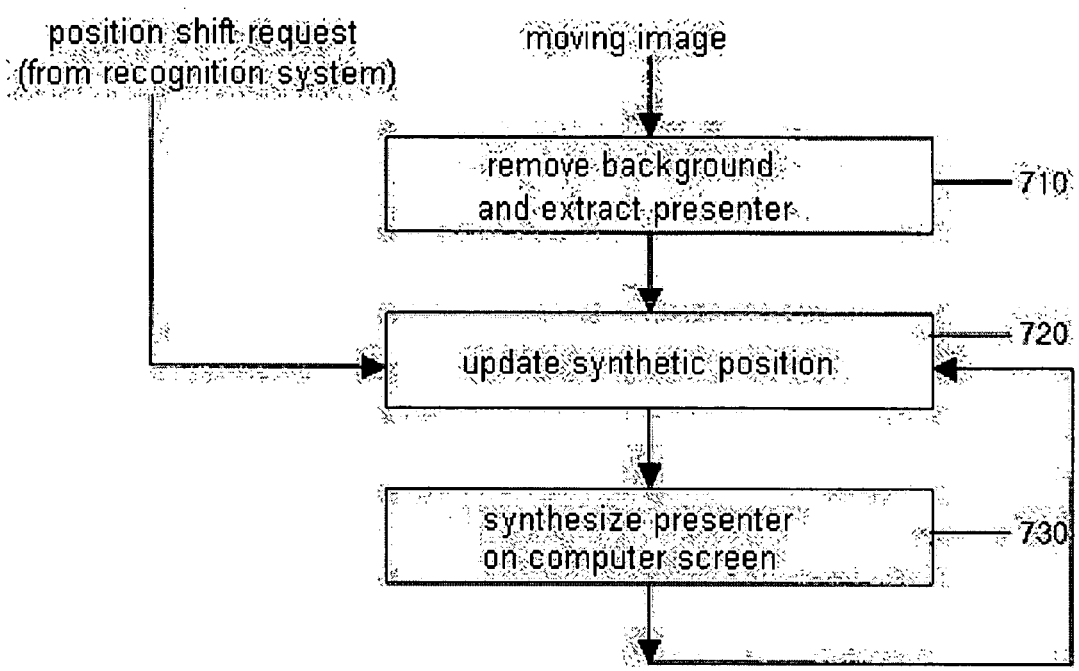
FIG. 7 illustrates a flow chart of the algorithm executed in the image synthesis system in accordance with the present invention.

FIG. 7 illustrates a flow chart of the algorithm executed in the image synthesis system in accordance with the present invention. The image synthesis system 140 of FIG. 1 receives an image of the presenter 110 output from the active infrared camera 120, creates a composite image of the presenter 110's image and presentation materials, and sends it to the projector 170 or to a computer at a remote place via a network. As illustrated in FIG. 7, the image synthesis algorithm comprises the step 710 of removing the background and extracting the presenter, the step 720 of updating the synthetic position, and the step 30 of synthesizing the presenter on a presentation screen. In the step 710 of removing the background and extracting the presenter, only the presenter blob is extracted from a moving image input from the moving image camera 225 of the active infrared camera 120. The background removal algorithm useable here representatively includes the chromakeying technique. This technique is a well-known technique of extracting an object blob (i.e., presenter blob) as a blob of interest by making the background in a predetermined color (for example, blue) and designating the alpha value of the color value of the background blob as 0 and the alpha value of the remaining object blobs as 1. In the step 730 of synthesizing the presenter on the presentation screen, the presenter blob extracted according to the following synthesis formula is synthesized in the data screen of the computer.

$$C = \alpha F + (1-\alpha)B$$

Wherein C represents a synthesis value, F represents the value of the presenter blob corresponding to the foreground (i.e., object), and B represents the value of the computer screen corresponding to the background. Here, value α is an alpha value obtained after separating the foreground and the background by the chromakeying method. In this way, only the presenter blob is extracted and synthesized on the data screen of the computer, thereby showing the presenter as if the presenter exists on the data screen of the computer. Here, in order for the presenter to move on the computer screen as desired, two methods are used. One is using a position shift command. The presenter can shift to a desired position on the data screen of the computer by receiving the shift command from the command recognition system 130 (step 720). The other method is that the presenter 110 walks himself or herself to a desired direction in field of view of camera.

Figure 8:
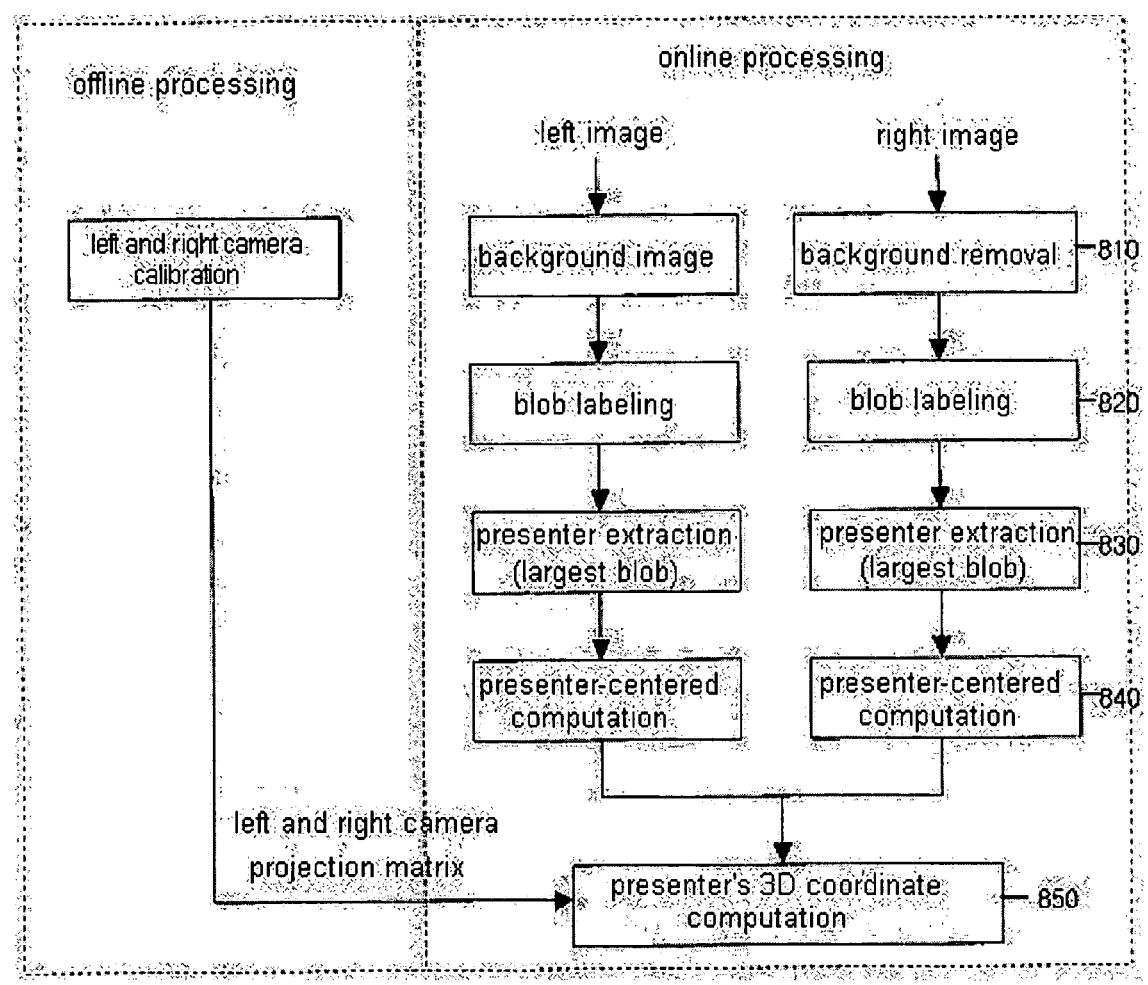
FIG. 8 is a flow chart showing the operation of a 3D motion tracking system in accordance with the present invention.

FIG. 8 is a flow chart showing the operation of a 3D motion tracking system in accordance with the present invention. The 3D motion tracking system 150 of FIG. 1 is connected to a stereo camera set 160 consisting of a plurality of cameras (in FIG. 8, consisting of two cameras), receives the image of the presenter from the stereo camera set 160 to separate the presenter blob and computes the presenter position on the 3D image coordinate. The operation of the 3D motion tracking system 150 in this procedure is described with reference to FIG. 8. The operation of the 3D motion tracking system 150 includes an offline operation and an online operation. Firstly, in the offline operation, the positional relation between a plurality of cameras is estimated through a calibration process. The calibration process is a well-known task necessary for an accurate tracking, and estimates intrinsic parameters representing the geometric optical characteristic of the insides of the cameras and extrinsic parameters representing the translation and rotation of a camera coordinate for a reference frame by using correspondence between a 3D Euclidean space and a 2D camera image plane. This process is accomplished by estimating the correspondence between the feature point of the 2D image coordinate and the 3D reference frame. With a pinhole camera model as an example, the points $X_i=[X_i, Y_i, Z_i, 1]$ on a 3D space and the points $x_i=[u_i, v_i, 1]$ corresponding to a 2D image have the following relation:

$$sx_i = PX_i$$

If $X_i$ and $x_i$ are substituted, $$s[u_i, v_i, 1]^T = P[X_i, Y_i, Z_i, 1]^T$$

wherein s is a scaling factor, and P is a 3×4 camera projection matrix. If there are enough corresponding points between the image and the 3D space, P can be obtained by the following formula:

$$u_i = \frac{p_{11}X_i + p_{12}Y_i + p_{13}Z_i + p_{14}}{p_{31}X_i + p_{32}Y_i + p_{33}Z_i + p_{34}},$$

$$v_i = \frac{p_{21}X_i + p_{22}Y_i + p_{23}Z_i + p_{24}}{p_{31}X_i + p_{32}Y_i + p_{33}Z_i + p_{34}}$$

Wherein $p_{ij}$ is the (i, j)-order element of matrix P.

Next, in the online operation, the image of the presenter is acquired and computed. Images input from the respective cameras by frame undergo a presenter extraction process. In this process, the background blob is removed by the chromakeying method or the like in step 810, and the largest one of the object blobs not removed by the blob labeling step 820 is extracted in step 830. Next, the central value of the presenter blob is computed in step 840, and the central value of the thus-extracted presenter blob is substituted into $x_i$ of the formula explained offline in the camera calibration process, thereby enabling it to compute the 3D position value $X_i$ of the presenter in real time.

The 3D position information of the presenter thus computed is sent to the above-described image synthesis system 140, and thereby the image of the presenter 110 can be synthesized at a proper position of the presentation material image displayed in 3D.

Figure 9A:
FIG. 9a shows photographs of a presentation material screen on which the image of the presenter is three-dimensionally synthesized.
Figure 9B:
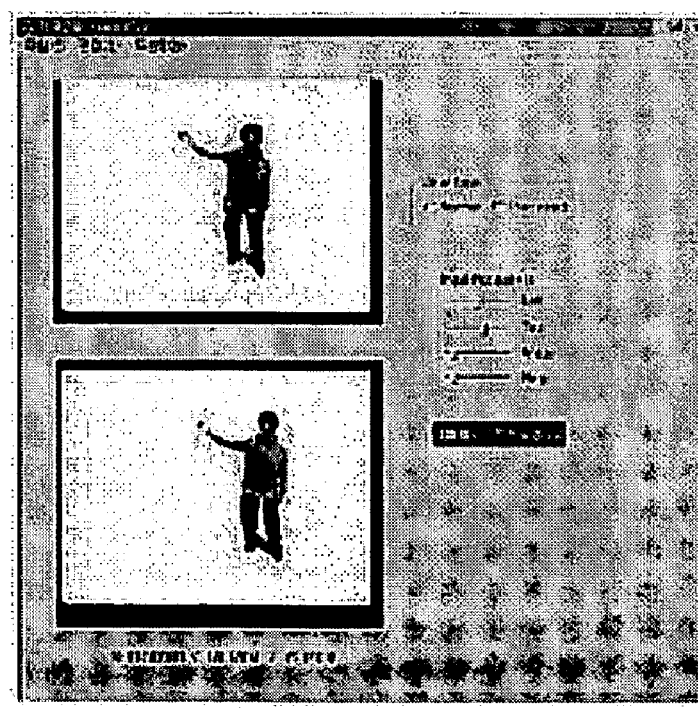
FIG. 9b shows photographs of a computer screen on which the image of the presenter is processed by 3D motion tracking system.

FIGS. 9a and 9b show photographs of a presentation material screen on which the image of the presenter is three-dimensionally synthesized by the aforementioned method. FIG. 9a is a photograph showing the presenter's image three-dimensionally synthesized on the presentation material screen. FIG. 9b is a photograph showing a computer screen on which the image of the presenter is being processed by the 3D position tracking system in accordance with the present invention. In FIG. 9a, it can be seen that the presenter is synthesized inside Sogguram which is the presentation material screen, and the presenter 110 is positioned behind the object of worship of the presentation material screen and thus parts of the presenter 110 are not shown, being hidden by the object of worship. In this way, the aforementioned 3D motion tracking system 150 computes the position of the presenter on the 3D image coordinate in the presenter's image input from the stereo camera set 160, and allows the avatar of the presenter to be synthesized at a proper position on the 3D material screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The interactive presentation system in accordance with the present invention provides the following effects.

While, in a prior art presentation system, a presentation has to be performed near a computer, a wireless mouse has to be used, or an assistant presenter has to control the presentation material screen in place of the presenter, in the presentation system of the present invention, the presenter can perform a presentation efficiently by himself or herself since the presenter is freely movable by controlling an interaction with his or her hands, voice and body.

Also, such interaction is discriminated from TV broadcasting in the respect that the interaction can be done in real time by employing a command recognition system with a sharply reduced amount of operation, and the presenter can control the presentation screen by himself or by herself.

Further, the presenter is able to perform a presentation while directly interacting with presentation materials by hands, body or voice in the presentation screen, thereby enabling presentations in more various ways than the prior art presentation systems.

Further, since the 3D position of the presenter can be tracked and utilized for the presentation, this provides such an effect that the presenter looks as if three-dimensionally moving among the presentation materials, thereby giving the reality which cannot be given from the prior art presentation system. Moreover, since the presenter can perform a presentation while directly interacting with presentation materials in a presentation image, it is possible to perform a far more natural and effective presentation than the prior art presentation systems. In other words, in the prior art presentation system the image of the presenter and the presentation materials are sent and displayed separately, which makes the audience to have no idea about what the presenter is pointing at and explaining and makes the presentation unnatural. Meanwhile, in the presentation system and method of the present invention, the presenter can explain while directly pointing by hand in a presentation image and interacting with the presentation materials, thereby enabling a natural presentation.

Moreover, this invention can solve the demerit that the resolution of the presentation materials has to be lower than the resolution of a display screen in order to display the presenter and the presentation materials side by side.

As seen from above, an audiovisual effect can be maximized by using the interactive presentation system of this invention.

What is claimed is:

1. An interactive presentation system, comprising:
   an active infrared camera, arranged in front of a presenter, for taking a visible image and an infrared image of the presenter;
   a command recognition system connected to the active infrared camera to perform a gesture recognition algorithm upon receipt of the infrared image of the presenter from the active infrared camera and outputting a corresponding command;
   an image synthesis system connected to the active infrared camera to synthesize the visible image of the presenter received from the active infrared camera and a presentation material, and connected to the command recognition system to control the presentation material upon receipt of a command signal outputted from the command recognition system; and
   a screen arranged in front of the presenter to display the synthesized visible image and the presentation material received from the image synthesis system, so that the presenter can perform a presentation while viewing the visible image of the presenter synthesized with the presentation material in real time.

2. The system of claim 1, wherein the active infrared camera comprises: an infrared irradiation device mounted so that an infrared irradiation region can be coincident with the visual field range of the active infrared camera and for irradiating infrared rays to the presenter; a cold mirror for transmitting the infrared rays reflected by the presenter and reflecting visible rays; an infrared camera for acquiring the infrared image of the presenter upon receipt of the infrared rays transmitted by the cold mirror; and a moving image camera for acquiring the image of the presenter upon receipt of the visible rays reflected by the cold mirror.

3. The system of claim 2, wherein the active infrared camera further comprises a reflecting mirror for making the visible rays incident on the moving image camera by receiving and reflecting the visible rays reflected by the cold mirror.

4. The system of claim 1, wherein the interactive presentation system further comprises infrared reflecting markers being wearable by the presenter and for retroreflecting infrared rays radiated by the infrared irradiation device of the active infrared camera onto the active infrared camera.

5. The system of claim 4, wherein the gesture recognition algorithm executed by the command recognition system comprises: a thresholding step of extracting image blobs of the infrared reflecting markers worn by the presenter inputted from the active infrared camera; a blob labeling step of performing image labeling of the blobs extracted by the thresholding step; a blob recognition step of extracting one or two large labeling blobs by the blob labeling step; an angle and position computation step of computing the angle, central position, height and width of the infrared reflecting markers using the extracted blobs by the blob recognition step; and a gesture recognition step of recognizing a gesture by determining a gesture mode of the infrared reflecting markers based on the results computed in the angle and position computation step.

6. The system of claim 5, wherein, in the blob labeling step, a predetermined boundary blob is set around the infrared reflecting marker blobs acquired from the previous frame so that labeling is performed only within the boundary blob in the next frame.

7. The system of claim 1, wherein the interactive presentation system receives a voice command of the presenter and outputs a command signal to the image synthesis system.

8. The system of claim 1, wherein the interactive presentation system further comprises: a stereo camera set consisting of a plurality of cameras for three-dimensionally detecting the motion of the presenter; and a 3D motion tracking system connected to the stereo camera set and for computing the position of the presenter on a 3D image coordinate by receiving the image of the presenter from the stereo camera set, wherein the 3D motion tracking system is connected to the image synthesis system via a network and sends the position information of the presenter to the image synthesis system so that the image of the presenter can be synthesized in a proper position of a 3D presentation material image if the presentation material image is 3D.

9. The system of claim 1, wherein the interactive presentation system further comprises a projector connected to the image synthesis system and for projecting the presentation material synthesized in the image synthesis system.

10. The system of claim 1, wherein the image synthesis system sends the presentation materials synthesized in the image synthesis system to a remote place via a network.

* * * * *